United States Patent Office 3,445,455
Patented May 20, 1969

3,445,455
L-LYXOPYRANOSYLOXY-ALKYLCOUMARIN-CONTAINING GLYCOSIDES
Joseph Kiss and Hans Spiegelberg, Basel, and Bruno Peter Vaterlaus, Binningen, Switzerland; Albert Israel Rachlin, Hackensack, N.J., and Karl Doebel, Ossining, N.Y., assignors to Hoffmann-La Roche Inc., Nutley, N.J., a corporation of New Jersey
No Drawing. Continuation of application Ser. No. 150,203, Nov. 6, 1961, now Patent No. 3,268,511, dated Aug. 23, 1966. Divided and this application Apr. 25, 1966, Ser. No. 544,832
Claims priority, application Switzerland, Nov. 7, 1960, 12,423/60
Int. Cl. C07c 49/18; C07d 7/46
U.S. Cl. 260—210                 9 Claims

ABSTRACT OF THE DISCLOSURE

Compounds of the formulas

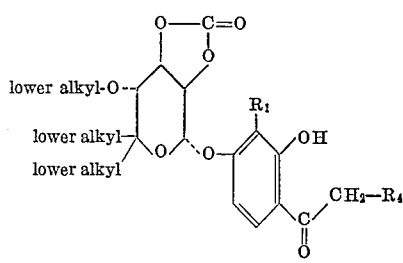

and

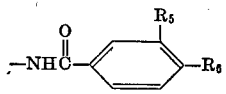

useful as intermediates in the synthesis of novobiocin, dihydro novobiocin and structurally analogous antibiotics are disclosed along with methods for their preparation.

This application is a continuation of parent application Ser. No. 150,203, filed Nov. 6, 1961, now U.S. Patent No. 3,268,511.

The invention concerns a method for the synthesis of novobiocin, dihydro novobiocin and structurally analogous antibiotics characterized in that α-glycosides of 5,5-di-lower alkyl-4-O-lower alkyl-2,3-cyclocarbonate-L-lyxopyranose are used as starting materials. More particularly, the method of the invention is characterized in that β-(5-5-di-lower alkyl-4-O-lower alkyl-2,3-cyclocarbonato)-L-lyxopyranosyl halides are condensed with a compounds selected from the group consisting of compounds of the formula

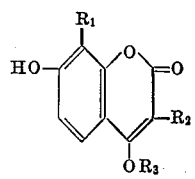

I and compounds of the formula

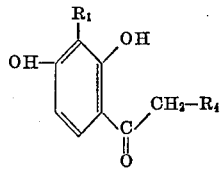

II wherein $R_1$ is selected from the group consisting of hydrogen, halogen and lower alkyl; $R_2$ is selected from the group consisting of hydrogen, nitro, nitroso, protected amino and acylamino; $R_3$ is benzyl; and $R_4$ is selected from the group consisting of hydrogen, nitro, nitroso, protected amino and acylamino.

When the above condensation is practiced with a compound of Formula I, the obtained product can, in any sequence, be catalytically hydrogenated, reacted with ammonia, a primary amine or a secondary amine, and acylated. In the case wherein $R_2$ in Formula I represents hydrogen, acylation is effected only after $R_2$ has been converted into an amino group. Similarly, when the above condensation is practiced with a compound of Formula II, the obtained product can, in any sequence, be cyclized with the introduction of a carbonyl function, and be reacted with ammonia, a primary amine or a secondary amine; also, the radical $R_4$ can be converted into amino and then be acylated.

As used in this application, the term "lower alkyl" includes both straight and branched chain carbon-hydrogen groups such as methyl, ethyl, n-propyl, isopropyl, n-butyl, isobutyl and the like. The term halogen includes chlorine, bromine and iodine. Protected amino is illustrated by groups which may be removed by hydrogenation, e.g. benzyloxycarbonylamino, dibenzylamino, and the like, or by alkaline hydrolysis, e.g. trifluoroacetamino, and the like, while acylamino includes aroylamino, e.g. benzoylamino and substituted benzoylamino, phenoxylakanoylamino, e.g. phenoxyacetamino and substituted phenoxyacetamino, and aralkanoylamino, e.g. phenylacetamino and substituted phenylacetamino. Substituted benzoylamino are e.g. 4-(hydroxy-, lower alkanoyloxy- or lower alkoxy)—benzoylamino groups which can be further optionally substituted in the 3-position by lower alkyl- or lower alkenyl- substituents, as e.g. 3-methylbutyl, 3-methyl-2-butenyl, or the like. Thus, the preferred benzoylamino radicals are of the formula $$-NH\overset{O}{\underset{\|}{C}}-\underset{}{\text{(ring)}}-R_6$$

with $R_5$ wherein $R_5$ is selected from the group consisting of hydrogen, lower alkyl and lower alkenyl; and $R_6$ is selected from the group consisting of hydrogen, hydroxy, lower alkanoyloxy and lower alkoxy. The same nuclear substituents may be present in the phenoxyalkanoylamino or aralkanoylamino groups.

There are obtained, via the condensation reaction of the invention, α-glycosides of 5,5-dialkyl-4-O-alkyl-2,3-cyclocarbonato-L-lyxopyranose of the following formulas:

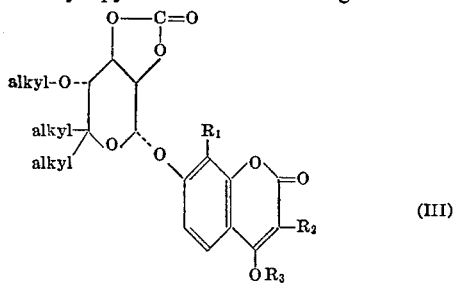

(III)

and

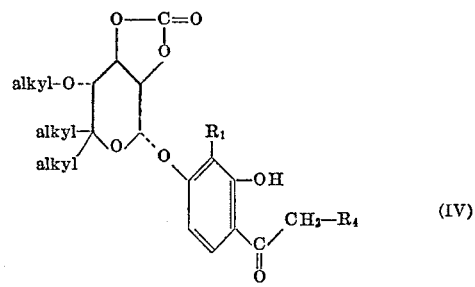

(IV)

wherein $R_1$ is selected from the group consisting of hydrogen, halogen, and lower alkyl; $R_2$ is selected from the group consisting of hydrogen, nitro, nitroso, protected amino and acylamino; $R_3$ is benzyl; and $R_4$ is selected from the group consisting of hydrogen, nitro, nitroso, protected amino and acylamino.

The L-lyxopyranosyl halides required as starting materials are new compounds. Of these, 5,5-dimethyl-4-O-methyl-2,3-cyclocarbonato-L-lyxopyranosyl chloride is a preferred starting material. It can, e.g., be prepared by treating 5,5-dimethyl-4-O-methyl-2,3-cyclocarbonato-methyl-L-lyxopyranoside with hydrogen chloride in nitromethane. The reaction can appropriately be carried out by introducing dry hydrogen chloride gas into a solution of the L-lyxopyranosides in nitromethane, suitably in the presence of acetyl chloride and at about 0° C. In an alternative embodiment of the invention the methyl-L-lyxopyranosides are dissolved in asym. dichlorodimethylether and the formation of the L-lyxopyranosyl chloride hastened via addition of a catalytic quantity of a Lewis acid, for example, freshly fused zinc chloride. By way of the above explained methods it is possible to prepare stable β-L-lyxopyranosyl halides, which represent important intermediates in the synthesis of novobiocin and novobiocin-like compounds.

The substituted coumarin derivatives of Formula I employed as starting materials are in part new compounds. A preferred group of starting materials are those wherein the substituent $R_1$ in the 8-position of the coumarin molecule represents hydrogen, halogen, preferably chlorine, or lower alkyl, such as methyl. A 4-benzyloxy-7-hydroxycoumarin derivative of Formula I above, wherein $R_2$ represents hydrogen, can be obtained from the corresponding 4-hydroxy compound via acid catalyzed etherification with benzyl alcohol. A compound of Formula I above, wherein $R_2$ represents acylamino or protected amino and $R_3$ represents hydrogen, can be obtained via the coupling of a 3-position unsubstituted 4-hydroxycoumarin derivative with a diazotized arylamine, for example, phenyldiazonium chloride. If this azo group is reductively split, which, for example, can be done catalytically in the presence of a hydrogenation catalyst, there is obtained the correspondingly substituted 3-amino-4-hydroxycoumarin, which is employed as an intermediate in the preparation of starting materials of Formula I above. The 3-amino-4-hydroxycoumarin derivatives can, for example, be reacted with a haloformic acid benzyl ester and phenyldiazomethane. There is obtained by this latter procedure a starting material of Formula I above, wherein $R_2$ represents benzyloxycarbonylamino and $R_3$ represents benzyl. Still another alternative embodiment for converting a 3-amino-4-hydroxycoumarin derivative into a starting material of Formula I above consists of reacting it with a benzoyl halide or with a substituted benzoyl halide bearing the substituents described above, thereby yielding a compound wherein $R_2$ represents an acylamino radical selected from the group consisting of benzoylamino and substituted benzoylamino. The same starting materials may be obtained by reaction with benzoic acid or a substituted benzoic acid, in the presence of carbodiimide. In order to produce compounds wherein $R_2$ represents a phenoxyalkanoylamino or aralkanoylamino groups, phenoxyalkanoic acids and halides thereof or aralkanoic acids and halides thereof are used as reactants. 3-nitro-4-benzyloxycoumarin derivatives represent another group of starting materials of Formula I above. They can, for example, be obtained by nitrating and benzylating 4,7-dihydroxycoumarins, in connection with which, however, the 7-position hydroxyl group should be protected prior to nitration, which for example, can be done by acetylation prior to the nitration. Finally, a coumarin derivative of Formula I above, wherein $R_2$ represents nitroso and $R_3$ represents benzyl, can be obtained by treating a 3-nitro-4-hydroxycoumarin derivative, which is obtained as above, with phosphorus pentachloride, and then converting the so-formed 3-nitroso-4-chloro derivative into the corresponding 4-benzyloxy compound.

The acetophenone derivative of Formula II above employed as starting materials are also in part new compounds. One procedure for obtaining compounds of Formula II above, wherein R represents hydrogen, consists e.g. in forming the addition product of resorcinol, or methylresorcinol or another, correspondingly substituted resorcinol, and acetonitrile and converting the imino group by hydrolysis into a keto group. These acetophenone derivatives so-obtained can then be halogenated in the α-position, and the halogen atom replaced by an amino group. By reaction of these amines with e.g. haloformic acid benzyl esters, a benzoyl halide, phenoxyalkanoyl halide, aralkanoyl halide or a substituted derivative thereof bearing the substituents described above, there is obtained a further class of starting material of Formula II above.

According to the method of the invention, the condensation of an L-lyxopyranosyl halide with a compound of Formula I or with a compound of Formula II can be conducted under the same conditions. Thus, proceeding from a β-L-lyxopyranosyl halide there can be prepared by a simple Walden inversion α-glycosides of 5,5-di-lower alkyl-4-O-lower alkyl-2,3-cyclocarbonato-L-lyxopyranose of the Formulas III and IV above, which are intermediates of special interest, as is made evident by the present invention.

Preferably the condensation of the β-L-lyxopyranosyl halide with a compound of Formula I or II is effected in anhydrous media, for example in anhydrous quinoline, anhydrous α-picoline, or some other suitable anhydrous tertiary base. Anhydrous quinoline is the preferred reaction medium. It is also suitable to work in the presence of a silver salt or silver oxide.

A preferred embodiment consists of dissolving, with warming, a starting material of Formula I or II above in a suitable amount of tertiary base, e.g. quinoline, whereupon, after cooling to room temperature, there is added thereto a suitable amount of freshly formed silver oxide and freshly calcined calcium sulfate. To this solution is added, with stirring, a solution of the L-lyxopyranosyl halide in tertiary base, e.g. quinoline. After agitation for several hours, the undissolved salts are separated, the reaction mixture diluted with a solvent non-miscible with water, such as methylene chloride or ethyl acetate, and the tertiary base extracted by shaking with dilute aqueous mineral acid. After concentration of the organic layer, there is obtained the crude reaction product, which can be further purified by methods known per se, e.g. by chromatography on silica gel or recrystallization.

When the above reaction is conducted with a compound of Formula I above, wherein $R_2$ represents hydrogen and $R_3$ represents benzyl, the product so-obtained can, if desired, be hydrogenated, whereby the compound is debenzylated and there is obtained a free hydroxy group in the 4-position of the coumarin molecule. The thus obtained 4-hydroxycoumarin compound can then be coupled with a diazotized arylamine, e.g. a phenyldiazonium chloride, and by catalytic reduction the so-obtained arylazo group in the 3-position can then be converted into an amino group.

The so-obtained amino compound, which can be denoted as a 3-amino-4-hydroxy-7-α-(5,5-di-lower alkyl-4-O-lower alkyl-2,3-cyclocarbonato-L-lyxopyranosyloxy)-8-(hydrogen, halogen or lower alkyl)-coumarin, is a new compound and represents an important intermediate product in the method of the instant invention. Condensation products having a protected amino group, e.g. benzyloxycarbonylamino, dibenzylamino or trifluoroacetamino, or a nitro or nitroso group in the 3-position al are converted into the corresponding 3-amino derivatives by catalytic hydrogenation. Also, under the influence of the catalytic hydrogenation, debenzylation in the 4-position simultaneously occurs.

These same 3-aminocoumarin derivatives can be obtained following the reaction of the pyranosyl halide with a compound of Formula II above, wherein $R_4$ represents hydrogen, by subsequent cyclization with introduction of a carbonyl group, for example, via reaction with diethylcarbonate, and by then reacting the cyclization product with a diazotized arylamine, and finally catalytically reducing the azo group. When the reaction of the pyranosyl halide is with a compound of Formula II above, wherein $R_4$ represents nitro, nitroso, or protected amino, e.g. benzyloxycarbonylamino, dibenzylamino or trifluoroacetamino, the cyclization and concurrent introduction of a carbonyl function, and the obtention of the free amino group by catalytic hydrogenation, can be effected in any sequence, whereby the same 3-aminocoumarin derivatives as above are again formed.

Following the conclusion of the above processes the so-obtained 3-amino-4-hydroxy-7-α-(5,5-di-lower alkyl-4-O-lower alkyl-2,3 - cyclocarbonato-L-lyxopyranosyloxy)-8-(hydrogen, halogen or lower alkyl)-coumarin can, if desired, be acylated and ammoniated. These reactions can be executed in either sequence. As one embodiment, the acylation is first undertaken by benzoylation with a benzoyl moiety having in the 4-position a hydroxyl, lower alkanoyloxy or lower alkoxy group and/or in the 3-position a lower alkyl- or lower alkenyl-substituent. Preferred acylating agents are 4-acetoxy-3-(3-methyl-butyl)-benzoyl chloride and 4-acetoxy-3-(3-methyl-2-butenyl)-benzoyl chloride. Subsequently, the treatment with ammonia can be effected, whereby the cyclocarbonato group is opened with formation of an O-carbamyl group and the lower alkanoyloxy in the 4-position of the benzoylamino substituent is saponified.

Besides the above described 3-aminocoumarin derivatives, the corresponding α-amino-acetophenone derivatives, which can be denoted as α-amino-2-hydroxy-3-(hydrogen, halogen, or lower alkyl)-4-α-(5,5-di-lower alkyl-4-O-lower alkyl-2,3-cyclocarbonato-L-lyxopyranosyloxy)-acetophenones, are new compounds and are important intermediate products in the method of the instant invention. These α-amino-acetophenone derivatives can be obtained by condensation of the lyxopyranosyl halide with a compound of Formula II above and conversion of the substituent $R_4$ into an amino group. These acetophenone derivatives can, in any sequence, be cyclized by concurrent introduction of a carbonyl group, reacted with ammonia, a primary amine or a secondary amine, and acylated.

After the condensation of the pyranosyl halide with a compound of Formula I, wherein $R_2$ represents acylamino, e.g. a benzoylamino group which in the 3- and/or in the 4-position bears an above-mentioned substituent, ordinarily only a treatment with ammonia is needed to obtain an active antibiotic compound. However, when the condensation is effected with a compound of Formula I, wherein $R_3$ is benzyl, the product so-obtained must, in addition to the ammonia treatment, be debenzylated. This debenzylation can be effected either before or after the treatment with ammonia. When the condensation is effected with a compound of Formula II, the product so-obtained must, in addition to the ammonia treatment, be cyclized with the introduction of a carbonyl group in order to obtain an active antibiotic compound. This cyclization can be effected either before or after the ammonia treatment.

More particularly, the methods described in the above paragraph, wherein the condensation is effected with a compound of Formula I, wherein $R_2$ is acylamino and $R_3$ is benzyl, can be accomplished by undertaking debenzylation by catalytic hydrogenation and also by chemical methods, for example by sodium in liquid ammonia. Suitably, after the cyclocarbonato ring is opened in the presence of liquid ammonia, the debenzylation is consummated by addition of metallic sodium to the reaction medium. This embodiment is especially suitable if the benzoylamino group has an alkenyl side chain which should remain unchanged, since such a double bond would not be attacked by ammoniacal sodium. In such a case, if the debenzylation is undertaken catalytically, the hydrogenation must ordinarily be interrupted after the absorption of one mole of hydrogen, in order that the alkenyl side chain will not also be hydrogenated.

In place of the ammonia treatment, the opening of the cyclocarbonato ring can also be undertaken by a reaction with a primary or secondary amine, e.g. with mono-lower alkyl- or di-lower alkyl-amine; thereby, for example, there are formed with the opening of the cyclocarbonato ring, N-lower alkyl- or N,N-di-lower alkyl- substituted 3-O-carbamyl compounds.

Via the methods of the instant invention there are obtained α-glycosides of 5,5-di-lower alkyl-4-O-lower alkyl-2,3-cyclo-carbonato-L-lyxopyranose as well as their 3-O-carbamyl derivatives (obtained by opening the cyclocarbonato ring), which are in part new compounds and which are useful as intermediates in the preparation of antibiotics. The novel 3-O-carbamyl derivatives of the invention can be represented by the following Formulas V and VI:

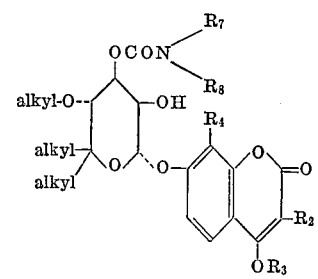

V and

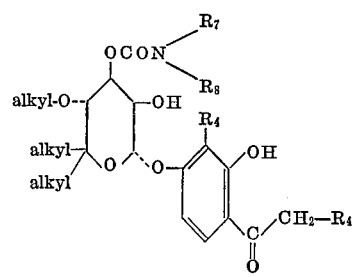

VI wherein $R_1$ is selected from the group consisting of hydrogen and halogen; $R_2$ is selected from the group consisting of hydrogen, nitro, nitroso, arylazo, amino, protected amino and acylamino; $R_3$ is benzyl, except when $R_2$ is selected from the group consisting of hydrogen and acylamino, $R_3$ is selected from the group consisting of hydrogen and benzyl, and, when $R_2$ is selected from the group consisting of arylazo and amino, $R_3$ is hydrogen; $R_4$ represents hydrogen, nitro, nitroso, amino, protected amino and acylamino; and $R_7$ and $R_8$ are selected from the group consisting of hydrogen and lower alkyl, Besides compounds of Formulas V and VI above, wherein $R_1$ is lower alkyl; $R_2$ is selected from the group consisting of hydrogen, nitro, nitroso, arylazo, amino and protected amino; $R_3$ is benzyl, except when $R_2$ is selected from the group consisting of arylazo and amino, $R_3$ is hydrogen; $R_4$ is selected from the group consisting of hydrogen, nitro, nitroso and amino; and $R_7$ and $R_8$ are selected from the group consisting of hydrogen and lower alkyl, As also compounds of Formulas V and VI above, wherein $R_1$ is lower alkyl, $R_2$ and $R_4$ are 4-(hydroxy, lower alkanoyloxy or lower alkoxy)-benzoylamino, $R_3$ is selected from the group consisting of hydrogen and benzyl, and $R_7$ and $R_8$ are selected from the group consisting of hydrogen and lower alkyl, and Compounds of Formulas V and VI above, wherein $R_1$ is selected from the group consisting of hydrogen, halogen and lower alkyl; $R_2$ and $R_4$ are amino; $R_3$ is hydrogen, and $R_7$ and $R_8$ are selected from the group consisting of hydrogen and lower alkyl.

The following examples are illustrative, but not limitative of the invention. The various alternative procedures are set forth in detail above, and the following examples are merely exemplary thereof. All temperatures are in degrees centigrade.

Example 1

6.2 g. of 5,5-dimethyl-4-O-methyl-2,3-cyclocarbonatomethyl-L-lyxopyranoside were dissolved in 10 ml. of freshly distilled acetyl chloride and 90 ml. of nitromethane. While cooling with ice, anhydrous hydrochloric acid gas was introduced until saturation, and then the solution was permitted to stand in a sealed container for 24 hours at room temperature. The solution was then concentrated in vacuo at a bath temperature of 40°. The residue consisted of 5,5-dimethyl-4-O-methyl-2,3-cyclocarbonato-L-lyxopyranosyl chloride.

Example 2

3.6 g. of 4-benzyloxy-7-hydroxy-8-methylcoumarin was mixed in a 4-necked flask equipped with a stirrer, thermometer and reflux condenser with 50 ml. of freshly distilled quinoline and brought to solution with stirring and warming to 90°. After cooling to room temperature, there was added 7.3 g. of anhydrous calcium sulfate and 3 g. of silver oxide and then, with stirring, a solution of 3 g. of 5,5-dimethyl-4-O-methyl-2,3-cyclocarbonato-L-lyxopyranosyl chloride in 10 ml. of quinoline. The temperature of the reaction mixture rose to between 25° and 30°. The mixture was further agitated for 6 hours at room temperature. 500 ml. of methylene chloride were then added thereto and the resulting mixture filtered free of calcium sulfate, silver chloride and surplus silver oxide. The resulting filtrate was then washed with methylene chloride. The combined filtrates were agitated with dilute sulfuric acid while being cooled with ice. Precipitated starting material was removed with suction and the methylene chloride solution thoroughly extracted with sulfuric acid. After being washed neutral with water, dried over sodium sulfate, and concentrated in vacuo, there remained a benzene soluble oil which was chromatographed on 50 g. of silica gel. The fractions eluated with benzene and benzene/ether (95:5) were crystallized from ether/methanol and yielded purified 4-benzyloxy-7-$\alpha$-(5,5-dimethyl-4-O-methyl-2,3-cyclocarbonato-L-lyxopyranosyloxy)-8-methylcoumarin melting at 144–146°; $[\alpha]_D^{24} = -60°$ (c.=1 in chloroform).

1.72 g. of 4-benzyloxy-7-$\alpha$-(5,5-dimethyl-4-O-methyl-2,3-cyclocarbonato-L-lyxopyranosyloxy)-8-methylcoumarin was dissolved in acetic acid and, following the addition of 3 g. of palladium carbon catalyst, hydrogenated at room temperature with slight pressure. Hydrogen absorption was stopped after a few minutes and the hydrogenated solution filtered free of the catalyst and evaporated in vacuo. There was thus obtained a solid foamy mass which upon recrystallization from benzene yielded 4-hydroxy-7$\alpha$-(5,5-dimethyl-4-O-methyl-2,3-cyclocarbonato-L-lyxopyranosyloxy)-8-methylcoumarin melting at 206° (weak coalescence at 133°); $[\alpha]_D^{22} = -62.3°$ (c.=1.015 in chloroform).

0.72 g. of aniline was dissolved in 28.8 ml. of 1 N hydrogen chloride. This solution was added at 0° to a solution of 0.58 g. of sodium nitrite in 2 ml. of water. After the diazotation ended, there was added with stirring first a concentrated aqueous solution of 2.88 g. of sodium acetate and then a solution of 3.03 g. of 4-hydroxy-7-$\alpha$-(5,5-dimethyl-4-O-methyl-2,3-cyclocarbonato-L-lyxopyranosyloxy)-8-methylcoumarin in methanol. There was thus obtained 3-phenylazo-4-hydroxy-7-$\alpha$-(5,5-dimethyl-4-O-methyl-2,3-cyclocarbonato-L-lyxopyranosyloxy)-8-methylcoumarin in the form of yellow needles, which were filtered off, washed with water and dried. The product was recrystallized from a mixture of equal parts of ethyl acetate and high boiling petroleum ether. It formed yellow crystalline rosettes melting at 154–155°; $[\alpha]_D^{22} = -121.5°$ (c.=1.075 in chloroform).

2.64 g. of 3-phenylazo-4-hydroxy-7-$\alpha$-5,5-dimethyl-4-O-methyl-2,3-cyclocarbonato-L-lyxopyranosyloxy)-8-methylcoumarin was dissolved in 200 ml. of ethyl acetate and hydrogenated at room temperature in the presence of palladium carbon catalyst. After termination of the hydrogen absorption the catalyst was filtered off and the filtrate washed with 0.1 N sulfuric acid and water. The solution was dried over sodium sulfate and concentrated in vacuo, whereby there was obtained 3-amino-4-hydroxy-7-$\alpha$-(5,5-dimethyl-4-O-methyl-2,3-cyclocarbonato-L-lyxopyranosyloxy)-8-methylcoumarin in the form of a golden-yellow colored product.

The above-obtained 3-amino-coumarin derivative was dissolved in 10 ml. of anhydrous pyridine and in the cold, dropwise with stirring, mixed with a solution of 1.418 g. of 4-acetoxy-3-(3-methyl-2-butenyl)-benzoyl chloride in 5 ml. of anhydrous pyridine. The reaction mixture was then stirred for 12 hours at room temperature, diluted with 300 ml. of ethyl acetate and thoroughly washed with dilute sulfuric acid in water. After being dried over sodium sulfate and being concentrated in vacuo, the residue obtained was taken up in benzene and chromatographed on 20 g. of silica gel. The fraction eluted with benzene/ether (95:5) yielded, after evaporation of the solution and after recrystallization, 3-[4-acetoxy-3-(3-methyl-2-butenyl)-benzoylamino]-4-hydroxy-7-$\alpha$-(5,5-dimethyl-4-O-methyl-2,3-cyclocarbonato-L-lyxopyranosyloxy)-8-methylcoumarin in the form of needles melting at 173–174°; $[\alpha]_D^{23} = -58.4°$ (c.=1.07 in chloroform).

810 mg. of 3-(4-acetoxy-3-[3-methyl-2-butenyl]-benzoylamino)-4-hydroxy-7-$\alpha$-(5,5-dimethyl-4-O-methyl-2,3-cyclocarbonato-L-lyxopyranosyloxy)-8-methylcoumarin and 25 ml. of liquid ammonia was permitted to react with one another while being stirred for an hour. After evaporation of the ammonia, the remaining oil was taken up in 50 ml. of 0.1 N sodium hydroxide, and the resulting solution then acidified by the addition of 1 N sulfuric acid. The milky precipitate which formed was extrated with ethyl acetate, and the extract washed with water, dried with sodium sulfate, and further taken to dryness by concentration in vacuo. The residue so-obtained was further purified by being crystallized three times from a 60% aqueous acetone solution. The product thus obtained, namely 3-[4-hydroxy-3-(3-methyl-2-butenyl)-benzoylamino]-4-hydroxy-7-α-(5,5 - dimethyl-4-O-methyl-3-O-carbamyl-L-lyxopyranosyloxy) - 8 - methylcoumarin melted at 159–161°; $[\alpha]_D^{25}=-62°$ (c.=1 in ethanol). It is identical with the natural antibiotic novobiocin and shows full novobiocin activity against *Staphylococcus aureus* P. 6538. The starting material used in this example, 4-benzyloxy-7-hydroxy-8-methylcoumarin, can be obtained from the corresponding 4-hydroxycoumarin derivative (prepared according to J.A.C.S. 80 [1958], 140–153) by heating with a ten-fold amount of benzyl alcohol in the presence of sulfuric acid as a catalyst. After crystallization from acetic acid it melts at 268–271°.

Example 3

5.15 g. of 3-[4-acetoxy-3-(3-methyl-butyl)-benzoylamino] - 4-benzyloxy-7-hydroxy-8-methylcoumarin were mixed with 100 ml. of freshly distilled quinoline and brought into solution with stirring and warming. After cooling to room temperature there was added 4.3 g. of silver oxide, freshly formed and dried over phosphorus pentoxide, and 8.6 g. of calcined calcium sulfate. There was poured into this suspension a solution of 2.5 g. of 5,5-dimethyl - 4 - O-methyl - 2,3-cyclocarbonato-L-lyxopyranosyl chloride and 25 ml. of quinoline. After several hours standing the undissolved salts were filtered off, and the filtrate diluted by the addition of ethyl acetate. The quinoline was removed from the ethylacetate solution by repeated agitation with 3 N sulfuric acid with the addition of ice. The solution was then washed with water and saturated sodium chloride solution until neutral. The residue obtained after drying and concentrating the ethyl acetate solution was dissolved in benzene and absorbed on a twenty-fold amount of silica gel and eluated with benzene/ether (90:10). The product obtained thereby was 3-[4-acetoy - 3-(3-methyl-butyl)-benzoylamino] - 4-benzyloxy - 7-α-(5,5 - dimethyl - 4-O-methyl-2,3-cyclocarbonato - L-lyxopyranosyloxy) - 8 - methylcoumarin; $[\alpha]_D^{25}=-13°$ (c.=1 in methylene chloride).

2.4 g. of 3-[4-acetoxy-3 - (3-methyl-butyl) - benzoylamino]-4-benzyloxy - 7-α-(5,5-dimethyl - 4-O-methyl-2,3-cyclocarbonato-L-lyxopyranosyloxy) - 8-methylcoumarin were dissolved in 100 ml. of methanol and hydrogenated at room temperature in the presence of carbon-palladium catalyst. After the hydrogen absorption was completed the catalyst was filtered off, the filtrate concentrated and the residue crystallized from methanol. There were obtained crystals of 3 - [4-acetoxy - 3 - (3-methyl-butyl)-benzoylamino] - 4-hydroxy-7-α - (5,5-dimethyl - 4-O-methyl-2,3-cyclocarbonato - L - lyxopyranosyloxy) - 8-methylcoumarin melting at 107–110°; $[\alpha]_D^{25}=-56.5°$ (c.=1 methylene chloride).

By treatment of the above-mentioned product with liquid ammonia and working up according to the procedure in Example 2, there was obtained 3-[4-hydroxy-3-(3-methyl-butyl)-benzoylamino]-4 - hydroxy - 7-α-(5,5-dimethyl - 4-O-methyl - 3-O-carbamyl - L-lyxopyranosyloxy)-8-methylcoumarin. The biological activity of this product is the same as the dihydro-novobiocin obtained by the hydrogenation of the natural antibiotic, novobiocin.

The new 4-benzyloxy-cumarin derivative employed as a starting material in this example can be obtained from the corresponding 4-hydroxy-coumarin derivative (prepared according to J.A.C.S. 80 [1958], 140–143) by benzylation with phenyldiazomethane in acetone.

Example 4

2.7 g. of 3-[4-acetoxy-3-(3-methyl-2-butenyl)-benzoylamino] - 4-benzyloxy-7-hydroxy-8-methylcoumarin were dissolved with warming in 16 ml. of freshly distilled quinoline. After cooling to room temperature, there was added to the solution 2.2 g. of silver oxide, freshly formed and dried over phosphorus pentoxide, and 4.3 g. of calcined calcium sulfate. There is then poured into this suspension a solution of 1.8 g. of 5,5-dimethyl-4-O-methyl-2,3-cyclocarbonato-L-lyxopyranosyl chloride in 20 ml. of quinoline. After being stirred for 5 hours at room temperature, the undissolved salts were filtered off and the filtrate diluted by addition of ethyl acetate. The quinoline was removed from the ethyl acetate solution by repeated agitation with 3 N sulfuric acid with the addition of ice and the solution then washed until neutral with water and saturated sodium chloride solution. The residue obtained after drying and concentrating the ethyl acetate solution was dissolved in benzene and, chromatographed in a twenty-fold amount of silica gel, and eluated with benzene/ether (90:10). The product thus obtained was 3-[4-acetoxy-3-(3-methyl-2-butenyl) - benzoylamino] - 4 benzyloxy - 7-α-(5,5-dimethyl-4-O-methyl-2,3 - cyclocarbonato-L-lyxopyranosyloxy) - 8-methylcoumarin. The IR spectrum yielded the following values:

$\nu[C=0]$carbonate=1815 cm.$^{-1}$
$\nu[C=0]$acetate=1760 cm.$^{-1}$
$\nu[C=0]$carbonate=1815 cm.$^{-1}$
$\nu[C=0]$acetate=1760 cm.$^{-1}$
$\nu[C=0]$lactone=1685 cm.$^{-1}$
$\nu[C=0]$amide=1640 cm.$^{-1}$ 1.9 g. of the above-obtained product was dissolved in 25 ml. of liquid ammonia and after 15 minutes mixed with metallic sodium until a persistent blue color was obtained. The excess sodium was decomposed by the addition of ammonium chloride. After the evaporation of the ammonia, the residue was dissolved in water and filtered, and the filtrate acidified by the addition of 1 N sulfuric acid. The milky precipitate obtained thereby was extracted with ethyl acetate and the ethyl acetate extract washed with water, dried with sodium sulfate and concentrated to dryness in vacuo. The residue was further purified by several crystallizations from a 60% aqueous acetone solution. The product obtained thereby, namely 3-[4-hydroxy-3-(3-methyl-2-butenyl) - benzoylamino] - 4 - hydroxy-7 - (5,5-dimethyl - 4-O-methyl-3 - O-carbamyl-L-lyxopyranosyloxy)-8-methylcoumarin is identical to the natural antibiotic novobiocin.

The 4-benzyloxy-coumarin derivative used as a starting material in this example can be obtained from the corresponding 4-hydroxy-coumarin derivative (prepared according to J.A.C.S. 80 [1958], 140–143) by benzylation with phenyldiazomethane in acetone.

Example 5

200 mg. of 3-[4-acetoxy-3-(3-methyl-butyl)-benzoylamino]-4-hydroxy-7-α-(5,5-dimethyl - 4 - O - methyl-2,3-cyclocarbonato - L-lyxopyranosyloxy)-8-methylcourmarin (obtained according to Example 3) were dissolved in 25 ml. of liquid methylamine. After 20 minutes reaction excess methylamine was evaporated off. The residue was taken up in 20 ml. of absolute methanol and the solution concentrated in vacuo. There were obtained 200 mg. of 3-[4-hydroxy - 3 - (3 - methyl - butyl)-benzoylamino]-4-hydroxy-7-α-(5,5 - dimethyl - 4 - O - methyl-3-N-methylcarbamyl-L-lyxopyranosyloxy)-8-methylcoumarin.

Example 6

200 mg. of 3-[4-acetoxy-3-(3-methyl-butyl)-benzoylamino]-4-hydroxy-7-α-(5,5-dimethyl - 4 - O - methyl-2,3-cyclocarbonato - L-lyxopyranosyloxy)-8-methylcourmarin (obtained according to Example 3) were dissolved in 25 ml. of liquid dimethylamine. After 20 minutes reaction excess dimethylamine was evaporated off at room temperature. The residue was taken up in 20 ml. of abs. methanol and the solution concentrated to dryness in vacuo. There were obtained 120 mg. of 3-[4-hydroxy-3-(3-methyl-butyl)-benzoylamino] - 4 - hydroxy-7-α-(5,5-dimethyl-4-O-methyl - 3 - N - dimethyl-carbamyl-L-lyxopyranosyloxy)-8-methylcoumarin.

Example 7

5 g. of 3 - [4 - methoxy-3-(3-methyl-butyl)-benzoylamino]-4-benzyloxy-7-hydroxy - 8 - methylcoumarin were dissolved in 100 ml. of abs. quinoline with warming. To this solution were added 4.3 g. of freshly precipitated silver oxide and 8.6 g. of fresh calcined calcium sulfate. To the suspension obtained were added dropwise 2.5 g. of 5,5-dimethyl-4-O-methyl-2,3-cyclocarbonato-L-lyxopyranosyl chloride and 25 ml. of abs. quinoline. The suspension obtained was stirred for 4 hours at room temperature, whereupon the precipitated silver salts and the starting material that had not reacted were filtered off over "Celite." The solution was diluted with ethyl acetate and washed successively with 3 N sulfuric acid until acid, with 2 N sodium carbonate solution and with water, then dried over sodium sulfate. The ethyl acetate was then evaporated off in vacuo. There were obtained 9.3 g. of a red-brown foam that was adsorbed on 160 g. of silica gel in benzene for further purification. The elution with benzene/ethyl acetate (20%) gave 3.3 g. of a red-brown foam that was further purified by taking up ethyl acetate and precipitating with isopropyl ether. This procedure was repeated twice. There were obtained 2 g. of a crystalline substance consisting of 3-[4-methoxy-3-(3-methyl-butyl)-benzoylamino]-4-benzyloxy - 7 - α - (5,5 - dimethyl-4-O-methyl - 2,3 - cyclocarbonato - L - lyxopyranosyloxy)-8-methylcoumarin.

3 g. of the above substance were dissolved in 50 ml. of tetrahydrofuran and 50 ml. of methanol, and hydrogenated at atmospheric pressure in the presence of 5% palladium carbon catalyst. After termination of the hydrogen absorption, the catalyst was filtered off and the filtrate concentrated to dryness in vacuo. The crystalline residue was recrystallised from few methanol. Yield 2.1 g.; M.P. 165–166° C. For purposes of analysis the substance obtained was recrystallised again from methylene chloride, whereby there were obtained 1.8 g. of 3-[4-methoxy-3-(3 - methyl - butyl)-benzoylamino]-4-hydroxy-7-α-(5,5-dimethyl - 4 - O - methyl-2,3-cyclocarbonato-L-lyxopyranosyloxy)-8-methylcoumarin of M.P. 168–169° $[\alpha]_D = -46°$ (c.=1 in methylene chloride).

300 mg. of the above compound were dissolved in 25 ml. of liquid ammonia. After 30 min. reaction the ammonia was evaporated off at room temperature and the residue was dried, twice taken up in 20 ml. of abs. methanol and evaporated in vacuo in order to eliminate the last traces of ammonia. There were thus obtained 200 mg. of 3-[4-methoxy-3-(3-methyl-butyl)-benzoylamino]-4-hydroxy-7-α-(5,5 - dimethyl-4-O-methyl-3-O-carbamyl-L-lyxopyranosyloxy)-8-methylcoumarin.

The starting material may be obtained as follows: 12.4 g. of 4-hydroxy-3-(3-methyl-2-butenyl)-benzoic acid ethyl ester, 50 ml. of acetone and 30 ml. of 3 N sodium hydroxide solution were placed in a 500 ml. four-neck flask. By means of two dropping funnels there were added dropwise simultaneously 95 ml. of 3 N sodium hydroxide solution and 18.9 g. of dimethylsulfate in such a way that the mixture remained alkaline. The temperature did not rise over 40°. The solution was stirred overnight at room temperature and then again 50 ml. of 3 N sodium hydroxide solution added thereto. The reaction medium was at first strongly acidic. The solution was heated for 2 hours at 75° in order to destroy the excess of dimethyl sulfate. The alkaline solution was extracted with about 500 ml. of ether, the ether solution dried, washed and thoroughly concentrated. There were thus obtained 11.4 g. of 4-methoxy-3-(3-methyl-2-butenyl)-benzoic acid ethyl ester.

60 g. of the above ester were refluxed for 3 hours with 250 ml. of 2 N methanolic sodium hydroxide. The methanol was evaporated off in vacuo, the wet residue thereupon acidified by means of 3 N sulfuric acid and the precipitated product sucked off. The solid material obtained was dissolved in 500 ml. of hot glacial acetic acid and to the solution obtained were added 250 ml. of water. On slowly cooling down, 47.5 g. of 4-methoxy-3-(3-methyl-2-butenyl)-benzoic acid crystallised out as long white needles of M.P. 127–128° C.

37.3 g. of the acid thus obtained were dissolved in 250 ml. of ethyl acetate and 50 ml. of glacial acetic acid. 5 g. of 5% palladium carbon catalyst were added to this solution, into which were introduced 3.6 liters of hydrogen (theoretical amount 3.85 liters). On concentrating the solution, the substance, 4-methoxy-3-(3-methyl-butyl)-benzoic acid, already crystallised. Th crude material obtained was used without further purification.

36 g. of the acid obtained above were dissolved in 120 ml. of thionyl chloride and refluxed for one hour. The thionyl chloride was thoroughly driven away and the residue distilled in high vacuo. The thus obtained 4-methoxy-3-(3-methyl - butyl)-benzoyl chloride distilled at 103–105°/0.05 mm./Hg. Yield 36 g.

18.5 g. of 3-amino-4,7-dihydroxy-8-methylcoumarin were dissolved in 250 ml. of abs. pyridine. To the solution obtained were added dropwise 23.7 g. of 4-methoxy-3-(3-methylbutyl)-benzoyl chloride while slightly cooling. The solution was stirred overnight, whereupon it was poured on 3 N sulfuric acid/ice. The precipitated product was filtered off and dried over phosphorus pentoxide. The dried product was recrystallised from 750 ml. of isopropanol; yield 10 g. The thus obtained 3-[4-methoxy-3-(3-methyl-butyl)-benzoylamino]-4,7-dihydroxy-8 - methylcoumarin melted at 227–228°.

20 g. of the compound thus obtained were dissolved in 1200 ml. of hot acetone. A slight residue was filtered off, and to the hot solution were added 200 ml. (0.45 mole) of phenyl diazomethane in petroleum ether. The reaction was vigorous and the product instantly began to crystallise out. The reaction mixture was allowed to stand overnight and filtered. There were thus obtained 10.5 g. of 3-[4-methoxy-3-(3-methyl - butyl) - benzoylamino]-4-benzyloxy-7-hydroxy - 8 - methylcoumarin of M.P. 249–250°.

Example 8

1.92 g. of 3-[4-acetoxy-3-(3-methyl-2-butenyl) - benzoylamino]-4-benzyloxy-7-hydroxy - coumarin were dissolved in 30 ml. of quinoline. 4 g. of calcium sulfate and 1.0 g. of 5,5-dimethyl-4-O-methyl-2,3-cyclocarbonate-L-lyxopyranosyl chloride were added thereto. At room temperature 1.0 g. of silver oxide is introduced. The temperature rose from 26 to 29° C. After 4 hours at room temperature, methylene chloride was added and the mixture filtered. The filtrate was extracted with 3 N sulfuric acid, then washed with water and dried over sodium sulfate. The solvent was removed in vacuo. The foamy residue weighed 3.31 g. which was chromatographed on 33 g. of silica gel for further purification. 260 ml. fractions were taken. The total crystalline fraction obtained from the eluate of benzene/ether (10%) weighed 0.8 g. and proved to be 3-[4-acetoxy-3-(3-methyl-2-butenyl) - benzoylamino]-4-benzyloxy-7-α-(5,5-dimethyl-4-O - methyl-2,3-cyclocarbonato-L-lyxopyranosyloxy) - coumarin. The material was recrystallised once from ethanol. M.P.= 194–196°; $[\alpha]_D^{23} = -62.0°$ (c.=1.125 in chloroform).

3 spoons of palladium mohr and 3 spoons of Darco G 60 were suspended in ethyl acetate and hydrogenated. When the hydrogenation had subsided, a solution of 420 mg. of the aforementioned coumarin in about 50 ml. of ethyl acetate was added and the whole mixture shaken with hydrogen. Theoretical uptake: 26.4 ml.; observed hydrogen uptake: 40 ml. within 5 minutes. The catalyst was filtered off and the filtrate washed carefully with methylene chloride. The filtrate was freed of the solvent in vacuo and the residue weighed 300 mg. After crystallisation from methanol, there were obtained 200 mg. of pure 3-[4-acetoxy(3-methyl - butyl) - benzoylamino] - 4-hydroxy-7-α-(5,5-dimethyl-4-O - methyl - 2,3 - cyclocarbonato-L-lyxopyranosyloxy)-coumarin of M.P. 163–164° C.; $[\alpha]_D^{24} = -76.9°$ (c.=0.9 in chloroform).

155 mg. of the compound thus obtained were dissolved in 20 ml. of liquid ammonia. By dropwise introduction of liquid ammonia in the course of 5 min., immediate dissolution occured. The ammonia was then allowed to evaporate within about 45 min. The residue was twice dissolved in 20 ml. of abs. methanol and evaporated. The clear white foamy residue was dried. There were thus obtained 120 mg. of 3-[4-hydroxy-3-(3-methyl-butyl)-benzoylamino]-4-hydroxy-7-α-(5,5-dimethyl-4-O - methyl - 3-O-carbamyl-L - lyxopyranosyloxy) - coumarin. $[\alpha]_D^{20}=$ —49.5° (c.=I in ethanol).

The starting material may be obtained as follows:

4.7 g. of 3-amino-4,7-dihydroxy-coumarin were dissolved in 30 ml. of abs. pyridine. 6.48 g. of 4-acetoxy-3-(3-methyl-2-butenyl)-benzoyl chloride in 20 ml. of abs. pyridine were added thereto and the mixture kept for 24 hours at room temperature. Ethyl acetate was added and the mixture washed several times with 3 N sulfuric acid to remove pyridine. The extract was then washed with water, dried and the solvent removed in vacuo. The residue was treated with methanol and the crystals were collected on a Buchner funnel. There were obtained 4.28 g. of crude material of M.P. 168–190°. After recrystallization from ethanol, the 3-[4-acetoxy-3-(3 - methyl - 2-butenyl)-benzoylamino]-4,7 - dihydroxycoumarin melted at 190–199° (decomposition).

2 g. of the aforementioned compound were dissolved in 60 ml. of abs. acetone and a methylene chloride solution of phenyl diazomethane added dropwise thereto in the cold, while stirring (18.7 ml. of a 0.25 molar phenyl diazomethane solution). After one hour's stirring, the solvents were removed in vacuo. The oily residue was taken up in ethyl acetate and washed with sodium bicarbonate solution. 1 N sulfuric acid and water. The solution was then dried, the sodium sulfate filtered off and the filtrate taken to dryness. The oily reddish residue weighed 2.66 g. Crystallisation was induced by covering the residue with high-boiling petroleum ether and scratching with a glass rod. Recrystallisation from acetone/petroleum ether (1:1.5 parts) yielded 300 mg. of 3-[4-acetoxy-3-(3-methyl-2-butenyl)-benzoylamino]-4 - benzyloxy - 7 - hydroxycoumarin of M.P. 205–207°.

Example 9

4.6 g. of 3-(4-acetoxy-benzamido)-4-benzyloxy-7-hydroxy-8-methylcoumarin were dissolved in 50 ml. of distilled dimethyl formamide at 70°. After cooling down, 50 ml. of quinoline were added thereto. Then, to the clear solution were added 4.3 g. of freshly precipitated silver oxide and 5 g. of anhydrous calcium sulfate. To the suspension obtained were added dropwise 2.5 g. of 5,5-dimethyl-4-O-methyl-2,3-cyclocarbonato-L - lyxopyranosyl chloride in 20 ml. of quinoline. The heterogenous solution was stirred for 4 hours at room temperature. Thereupon, the reaction mixture was diluted with 500 ml. of ethyl acetate and the silver salts and the starting material that had not reacted were filtered off over "Celite." The clear ethyl acetate solution was washed successively with 3 N sulfuric acid until strongly acid, 2 N sodium carbonate solution until alkaline and finally with water until neutral. To the ethyl acetate solution was added 1 g. of 1 g. of animal charcoal, the solution stirred for 20 min., filtered and dried over anhydrous sodium sulfate, filtered again and concentrated in vacuo. There were thus obtained 4.6 g of a red-brown foamy material. For the purification, this material was adsorbed on 80 g. of silica gel and eluted with benzene/ethyl acetate (20%). 1500 ml. of this eluate contained 3 g. of a red-brown foamy material, 3-(4-acetoxy-benzamido)-4-benzyloxy-7-α - (5,5-dimethyl-4-O-methyl-2,3-cyclocarbonato - L - lyxopyranosyloxy)-8-methylcoumarin, which can be used direct in the next reaction step.

3 g. of the compound thus obtained were thoroughly hydrogenated in 100 ml. of ethyl acetate in the presence of 1 g. of palladium carbon catalyst. The catalyst was then filtered off, the filtrate concentrated and the residue recrystallised from methanol. There were thus obtained 1.2 g. of 3-(4-acetoxybenzamido) - 4 - hydroxy - 7 - α-(5,5 - dimethyl - 4 - O - methyl - 2,3 - cyclocarbonato-L - lyxopyranosyloxy) - 8 - methylcoumarin of M.P. 140–150°. Another recrystallisation from methylene chloride/methanol gave 750 mg. of the same compound having a melting point of 198–200°. $[\alpha]_D=-38°$ (c.=1 in methylene chloride).

500 mg. of the compound thus obtained were dissolved in 25 ml. of liquid ammonia. After 20 min. reaction at room temperature, the ammonia was eliminated and the residue taken up in methanol. Concentrating in vacuo gave 200 mg. of a pale yellow foamy mass consisting of 3 - (4 - hydroxy - benzamido) - 4 - hydroxy - 7 - α-(5,5-dimethyl - 4 - O - methyl-3-O-carbamyl-L-lyxopyranosyloxy)-8-methylcoumarin.

The starting material may be obtained as follows: 25 g. of 3-amino-4,7-dihydroxy-8-methylcoumarin were dissolved in 240 ml. of absolute pyridine. To the solution obtained were added dropwise, while stirring and slightly cooling, 27 g. of p - acetoxy - benzoyl chloride. Stirring is continued overnight at room temperature. Then, the solution was acidified by means of 200 ml. of 3 N sulfuric acid, and the product that precipitated was sucked off and dried. After drying, the product was recrystallised from dioxane/alcohol. There were thus obtained 23 g. of crystalline 3 - (4 - acetoxy-benzamido)-4,7 - dihydroxy - 8 - methylcoumarin of M.P. 273–274° C.

3.2 g. of the compound thus obtained were dissolved in 250 ml. of hot dioxane, and few undissolved material was filtered off. To the still warm solution there were added 25 ml. of a 0.44 molar phenyl diazomethane solution in petroleum ether. Soon, the crystallisation began and the reaction mixture was allowed to stand overnight, whereupon the crystalline product was filtered off and washed with ether. There were thus obtained 1.3 g. of 3 - (4 - acetoxy-benzamido)-4-benzyloxy-7-hydroxy-8-methylcoumarin of M.P. 264–265°.

Example 10

5 g. of 3 - (4 - acetoxy - 3 - propyl - benzamido) - 4-benzyloxy - 7 - hydroxy - 8 - methylcoumarin were dissolved in 100 ml. of quinoline with heating. To this solution, there were added 4.3 g. of freshly precipitated silver oxide (dried over phosphorus pentoxide) and 8.6 g. of freshly calcined calcium sulfate. To the heterogenous reaction mixture there were added dropwise 2.5 g. of 5,5-dimethyl - 4 - O - methyl - 2,3 - cyclocarbonato - L - lyxopyranosyl chloride in 25 ml. of quinoline. The reaction was slightly exothermic. The solution was then stirred for 5 hours, whereupon the precipitated silver salts and the starting material that did not react were filtered off over "Celite." The clear filtrate was diluted with much ethyl acetate. The quinoline was then discarded by washing the solution successively with 3 N sulfuric acid until acid, with saturated soduim chloride solution and water until neutral. The solution was then dried over sodium sulfate, filtered and concentrated in vacuo; there were thus obtained 8.4 g. of a red-brown oil that was chromatographed for further purification. This oil was adsorbed on 160 g. of silica gel in benzene. The elution was carried out at first with benzene, then with benzene/ether (5%) and with benzene/ether (10%). The last eluate contained 3.1 g. of 3 - (4 - acetoxy - 3 - propyl - benzamido) - 4 - benzyloxy - 7 - α-(5,5 - dimethyl - 4 - O - methyl - 2,3 - cyclocarbonato-L - lyxopyranosyloxy) - 8 - methylcoumarin. 3.2 g. of this substance were dissolved in 30 ml. of ethyl acetate and thoroughly hydrogenated in the presence of 0.3 g. of palladium carbon catalyst. The catalyst was then filtered off and the filtrate concentrated in vacuo. There were thus obtained 3.1 g. of a pale yellow foamy substance, which was taken up in methanol and crystallised in the warmth. There were thus obtained 0.7 g. of 3 - (4 - acetoxy - 3 - propyl - benzamido) - 4 - hydroxy - 7 - α-(5,5-dimethyl - 4 - O - methyl - 2,3 - cyclocarbonato - L - lyxopyranosyloxy) - 8 - methylcoumarin of M.P. 174–177°. The mother liquors yielded another 1.6 g. of this substance. After a further recrystallisation from methanol/methylene chloride, the pure substance melted at 187–188°; $[\alpha]_D = -54°$ (c.=1 in methylene chloride).

To 25 ml. of liquid ammonia there were added 200 mg. of the above substance, which went immediately into solution. The ammonia was then evaporated off at room temperature. In order to eliminate the last traces of ammonia, the remaining solution was twice dissolved in 20 ml. of abs. methanol and concentrated in vacuo. There were thus obtained 200 mg. of a pale yellow foamy material, consisting of 3 - (4 - hydroxy - 3 - propyl - benzamido) - 4 - hydroxy-7α-(5,5-dimethyl-4-O-methyl-3-O-carbamyl-L-lyxopyranosyloxy)-8-methylcoumarin.

The starting material may be obtained as follows: 12 g. of 3 - amino - 4,7 - dihydroxy - 8 - methylcoumarin were dissolved in 120 ml. of abs. pyridine, whereupon the solution was cooled with ice and 15 g. of 3 - propyl-4 - acetoxy - benzoyl chloride added dropwise thereto. The reaction mixture was stirred overnight and the resulting clear solution acidified with 3 N sulfuric acid. The precipitated product was sucked off and thoroughly dried in a vacuum drying oven. Yield of crude product: 21 g. This product was recrystallised from 300 ml. of abs. ethanol and yielded 12.3 g. of 3 - (4-acetoxy-3-propyl-benzamido) - 4,7 - dihydroxy - 8 - methylcoumarin of M.P. 211–212°.

19.6 g. of the above compound were dissolved in 600 ml. of warm acetone. To the clear solution, there were added 135 ml. of a 0.44 molar solution of phenyl diazomethane in petroleum ether. The reaction started with simultaneous evolution of nitrogen, and the product began to crystallise. The reaction mixture was allowed to stand overnight and filtered to yield 5 g. of 3 - (4 - acetoxy - 3 - propyl - benzamido) - 4 - benzyloxy - 7 - hydroxy-8-methylcoumarin of M.P. 234–235°.

Example 11

4.8 g. of 3-(3,4,5-trimethoxy-benzamido-4-benzyloxy-7-hydroxy-8-methylcoumarin were dissolved in 150 ml. of abs. quinoline at 50°. The solution was cooled down to 25°, and 6 g. of silver oxide and 12 g. of calcined calcium sulfate were added thereto, whereupon nitrogen was conducted through the reaction mixture. 3 g. of 5,5-dimethyl-4-O-methyl-2,3-cyclocarbonato-L-lyxypyranosyl chloride in 50 ml. of nitro-methane were added dropwise to the reaction mixture within 30 min., while vigorously stirring. Once the addition completed, stirring was continued for 5 more hours. The solution obtained with then diluted with ethyl acetate and filtered together with a filter aid. The ethyl acetate solution was then washed successively with dilute sulfuric acid, water, sodium bicarbonate solution and water. Then, the solution was dried over sodium sulfate and the ethyl acetate distilled off in vacuo. The addition of isopropyl ether initiated the precipitation of a solid yellow material. There were thus obtained 4.5 g. of a solid substance, which was adsorbed on 80 g. of silica gel for further purification. The substance was eluted with a mixture of benzene and ethyl acetate (80:20). The residue obtained by concentrating the eluate was again taken up in a few amount of ethyl acetate and again precipitated with isopropyl ether. Thus, there were obtained 2.9 g. of 3-(3,4,5-trimethoxy-benzamido)-4 - benzyloxy - 7 - α - (5,5 - dimethyl - 4 - O - methyl-2,3-cyclocarbonate - L - lyxopyranosyloxy) - 8 - methylcoumarin.

2.9 g. of the above substance were dissolved in 100 ml. of ethyl acetate and hydrogenated in the presence of 1 g. of 5% palladium carbon catalyst, whereby 105 ml. of hydrogen were taken up. After hydrogenation, the catalyst was filtered off, the filtrate concentrated to dryness and crystallised from methylene chloride alcohol. Thus, there were obtained 1.75 g. of 3-(3,4,5-trimethoxy-benzamido)-4 - hydroxy - 7 - α - (5,5 - dimethyl - 4 - O - methyl - 2,3-cyclocarbonato - L - lyxopyranosyloxy) - 8 - methylcoumarin of M.P. 132–134° $[\alpha]_D^{21} = +32°$ (c.∞1 in methylene chloride).

600 mg. of the above compound were dissolved in 50 ml. of liquid ammonia. Once the solution was complete, the ammonia was evaporated off and the last trace of ammonia was elminated by twice dissolving the residue in 10 ml. of methanol and concentrating the solution obtained in vacuo. 560 mg. of 3-(3,4,5-thimethoxy-benzamido)-4-hydroxy - 7 - α - (5,5 - dimethyl - 4 - O - methyl - 3 - O-carbamyl - L - lyxopyranosylyoxy) - 8 - methylcoumarin were obtained as a colorless substance.

The starting material may be obtained as follows: 20 g. 3-amino-4,7-dihydroxy-8-methylcourmarin, 24 g. of 3,4,5-trimethoxy-benzoyl chloride and 400 ml. of abs. pyridine were stirred overnight at room temperature. Then, the reaction mixture was poured over ice cold diluted sulfuric acid, filtered, washed with water and dried over sodium sulfate. After evaporating off the solvent in vacuo, the residue was crystallised from dioxane. Thus, 12 g. of 3 - (3,4,5 - trimethoxy - benzamino) - 4,7 - dihydroxy - 8-methylcoumarin were obtained; M.P. 283–285°.

12 g. of the above compound were refluxed in 1 liter of dioxane. The solution obtained was cooled to about 50° and treated with 125 ml. of a 0.45 molar solution of phenyl diazomethane in low-boiling petroleum ether. The solution was allowed to stand overnight at room temperature, then concentrated to dryness in vacuo. The viscous residue was dissolved in boiling ethyl acetate. On cooling down, the substance crystallised. The pale yellow crystals obtained were sucked off and washed with ether. There were thus obtained 3.5 g. of 3-(3,4,5-trimethoxy-benzamido) - 4 - benzyloxy - 7 - hydroxy - 8 - methylcoumarin of M.P. 247–248°.

Example 12

4.15 g. of 3 - (phenylacetamido) - 4 - benzyloxy - 7 - hydroxy-8-methylcoumarin were dissolved in 100 ml. of abs. quinoline with warming. The solution was cooled down and to it were added 4.3 g. of silver oxide( dried over phosphorus pentoxide) and 8.6 g. of freshly calcined calcium sulfate. To this heterogenous solution were then added 2.5 g. of 5,5-dimethyl-4-O-methyl-2,3-cyclocarbonato-L-lyxopyranosyl chloride in 25 ml. of quinoline. The reaction mixture was then stirred for 4½ hours and freed, by filtration over "Celite," of precipitated silver salts and starting material that had not reacted. The filtrate was diluted with ethyl acetate and the quinoline eliminated by shaking with 3 N sulfuric acid. Thereupon, the acidic solution was washed until neutral with water and saturated sodium chloride solution, dried over anhydrous sodium sulfate and concentrated to dryness in vacuo. The residual 7.5 g. of red-brown oil were chromatographed for further purification. 7 g. of the substance thus obtained were adsorbed on 160 g. of silica gel in benzene. The foamy material obtained by eluation with benzene/ethyl acetate (20%) was precipitated from ethyl acetate by means of isopropyl ether for further purification. 3.3 g. of a cream colored powder were thus obtained, which consisted of 3-(phenyl - acetamido) - 4 - benzyloxy - 7 - α - 5,5 - dimethyl-4 - O - methyl - 2,3 - cyclocarbonato - L - lyxopyranosyloxy)-8-methylcoumarin.

3.3 g. of the above pure powder were dissolved in 100 ml. of a tetrahydrofurane/methanol solution (1:1). The solution was thoroughly hydrogenated in the presence of 500 mg. of palladium carbon catalyst, whereby 125 ml. of hydrogen were adsorbed. The catalyst was then filtered off and the clear filtrate concentrated in vacuo. The substance thus obtained was recrystallised from acetone and isopropanol, and recrystallised twice from acetone/carbon tetrachloride for further purification. There were thus obtained 200 mg. of 3-(phenylacetamido)-4-hydroxy-7-α - (5,5 - dimethyl - 4 - O - methyl - 2,3 - cyclocarbonato-L-lyxopyranosyloxy)-8-methylcoumarin of M.P. 165–166°; $[\alpha]_D = -52°$ (c.=1 in methylene chloride).

200 mg. of the above compound were dissolved in 25 ml. of liquid ammonia. Once the solution was complete, the ammonia was distilled off at room temperature and the last traces of ammonia were eliminated by twice dissolving the residue in 10 ml. of abs. methanol and concentrating in vacuo. The pale yellow foamy material thus obtained consisted of 3-(phenyl-acetamido)-4-hydroxy-7-α - (5,5 - dimethyl-4-O-methyl-3-O-carbamoyl-L-lyxopyranosyloxy)-8-methylcoumarin. Yield: 180–200 mg.

The starting material may be obtained as follows: 4.1 g. of 3-amino-4,7-dihydroxy-8-methylcoumarin were dissolved in 70 ml. of abs. pyridine. To the solution obtained there were added 5.6 g. of phenyl acetic acid anhydride while slightly cooling. The reaction mixture was stirred overnight, the resulting clear solution poured over glacial 3 N sulfuric acid. The precipitated product was sucked off and washed with ether until the filtrate was clear. The crude product (4.1 g.) was recrystallised from 150 ml. of nitromethane. 2.1 g. of 3-(phenylacetamido)-4,7-dihydroxy-8-methylcoumarin were thus obtained; M.P. 243–245°.

20 g. of the compound thus obtained were dissolved in 550 ml. of boiling acetone and a few undissolved material filtered off. To the hot solution, there were added 200 ml. of a 0.5 molar solution of phenyl diazomethane in petroleum ether. Adding porous clay to the solution initiated a vigorous reaction. The product began to crystallise. The reaction mixture was allowed to stand overnight and filtered. 10 g. of crude 3-(phenylacetamido)-4-benzyloxy-7-hydroxy-8-methylcoumarin were thus obtained; M.P. 248–250° C.

Example 13

10 g. of 3-[2,4-diacetoxy-5-(3-methyl-butyl)-benzamido]-4-benzyloxy-7-hydroxy-8-methylcoumarin were dissolved in 200 ml. of quinoline. To this solution were added 10 g. of silver oxide, 20 g. of calcium sulfate and, while stirring, 9.44 g. of 5,5-dimethyl-4-O-methyl-2,3-cyclocarbonato-L-lyxopyranosyl chloride dissolved in 50 ml. in quinoline. The reaction mixture was stirred for 4 hours and diluted with ethyl acetate, whereupon it was filtered together with a filter aid. The filtrate was then washed successively with diluted sulfuric acid, water, potassium bicarbonate and water, dried over sodium sulfate and the solvent distilled off in vacuo. The brown oily residue was chromatographed on 200 g. of silica gel. The substance was eluted with benzene/ethyl acetate (20%) and 9.6 g. of a yellow foamy material were obtained, which were again chromatographed in 150 g. of silica gel. Another elution with benzene/ethyl acetate (10%) gave 6.5 g. of 3 - [2,4-diacetoxy-5-(3-methylbutyl)-benzamido]-4-benzyloxy-7-α-(5,5-dimethyl-4-O-methyl-2,3 - cyclocarbonato-L-lyxopyranosyloxy)-8-methylcoumarin as a yellow foamy material.

6.5 g. of the substance thus obtained were dissolved in 80 ml. of ethyl acetate and hydrogenated in the presence of 1 g. of 5% palladium carbon catalyst. Once the hydrogen uptake had subsided, the solution was filtered and the filtrate concentrated to dryness in vacuo. For further purification, the substance obtained was dissolved in acetone and precipitated with water. This procedure was repeated 3 times. Thus, there were obtained 3.4 g. of 3[2,4-diacetoxy-5-(3-methyl-butyl)-benzamido]-4-hydroxy - 7-α-(5,5-dimethyl-4-O-methyl-2,3-cyclocarbonato-L-lyxopyranosyloxy) - 8 - methylcoumarin as a white substance of $[\alpha]_D^{26}=-24°$ (c.=1 in methylene chloride).

300 mg. of the compound thus obtained were dissolved in 15 ml. of liquid ammonia. Once the solution was complete, the ammonia was evaporated off at room temperature. The residue was taken up in 10 ml. of absolute methanol and again concentrated in vacuo. This operation was repeated once again and thus 250 mg. of 3-[2,4-dihydroxy - 5 - (3 - methyl-butyl)-benzamido]-4-hydroxy-7-α-(5,5-dimethyl-4-O-methyl-3-O-carbamyl - L - lyxopyranosyloxy)-8-methylcoumarin were obtained as colorless powder.

The starting material may be obtained as follows: 24 g. of 3-amino-4,7-dihydroxy-8-methylcoumarin, 34.4 g. of 2,4-diacetoxy-5-(3-methyl-butyl)-benzoic acid and 32 g. of dicyclohexyl-carbodiimide were dissolved in 400 ml. of dimethyl formamide and stirred overnight at room temperature. Thereupon, 50 ml. of 50% acetic acid were added thereto, stirring was continued for 15 min., the solution obtained free of dicyclohexyl urea by filtration and the filtrate diluted with 2 liters of ethyl acetate. Thereupon, the ethyl acetate solution was washed successively with dilute hydrochloric acid, water, potassium bicarbonate and water, the ethyl acetate solution was treated with animal charcoal, filtered, dried over sodium sulfate and distilled in vacuo. After recrystallisation from nitromethane, there were obtained 30.2 g. of 3-[2,4-diacetoxy-5 - (3-methyl-butyl)-benzamido]-4,7-dihydroxy-8-methylcoumarin of M.P. 215°.

30 g. of the compound thus obtained were dissolved in 1200 ml. of acetone at boiling temperature. The solution obtained was allowed to cool down and 200 ml. of a 0.59 molar solution of phenyl diazomethane in low-boiling petroleum ether were added thereto. The reaction mixture was allowed to stand overnight, the acetone was then distilled off in vacuo and the residual oil taken up in a few nitro methane. After addition of isopropyl ether, 13.3 g. 3 - [2,4 - diacetoxy - 5 - (3-methyl-butyl)-benzamido]-4-benzyloxy-7-hydroxy-8-methylcoumarin crystallised; M.P. 162–164°.

Example 14

4.3 g. of 3-(phenoxy-acetamido)-4-benzyloxy-7-hydroxy-8-methylcoumarin were dissolved in 100 ml. of abs. quinoline with warming. The solution was then cooled down to 35° and to it were added 4.3 g. of freshly precipitated silver oxide (dried over phosphorus pentaoxide), 8.6 g. of freshly calcined calcium sulfate and, dropwise, 2.5 g. of 5,5-dimethyl-4-O-methyl-2,3-cyclocarbonato-L-lyxopyranosyl chloride in 25 ml. of abs. quinoline. The heterocyclic suspension was stirred for 4 hours and filtered over "Celite" in order to remove the precipitated silver salts and starting material that did not react. The clear filtrate was then diluted with ethyl acetate and the quinoline removed from the ethyl acetate solution by extraction with 3 N sulfuric acid. The ethyl acetate solution was then washed with water and saturated sodium chloride solution, dried over sodium sulfate and concentrated in vacuo. There were thus obtained 4.9 g. of 3-(phenoxyacetamido) - 4 - benzyloxy-7-α-(5,5-dimethyl-4-O-methyl-2,3-cyclocarbonato-L-lyxopyranosyloxy)-8-methylcoumarin as an ochre colored foamy material.

4.1 g. of the above compound were dissolved in 200 ml. ethyl acetate and thoroughly hydrogenated in the presence of 200 mg. of 5% palladium carbon catalyst. The catalyst was filtered off and the solvent removed in vacuo. In order to further purify the oily product obtained, this was adsorbed on 25 g. of silica gel in benzene/ethyl acetate (1:1 by volume) and eluted. The elute contained 2.4 g. of a substance that was crystallised from acetone/isopropanol. Thus, there were obtained 800 mg. of 3-(phenoxyacetamido) - 4 - hydroxy-7-α-(5,5-dimethyl-4-O-methyl-2,3-cyclocarbonato - L - lyxopyranosyloxy)-8-methylcoumarin of M.P. 173–176°. After further recrystallisation from acetone/carbon tetrachloride, there were obtained 600 mg. of the same substance melting at 179°; $[\alpha]_D=-49°$ (c.=1 in methylene chloride).

300 mg. of the substance thus obtained were dissolved in 30 ml. of liquid ammonia, immediate solution occurring thereby. Thereupon, the ammonia was evaporated off at room temperature and in order to remove the last traces of ammonia, the residue was twice dissolved in 20 ml. of abs. methanol and concentrated to dryness. 300 mg. of 3 - (phenoxy - acetamido) - 4 - hydroxy - 7 - α - (5,5-dimethyl-4-O-methyl-3-O-carbamyl-L-lyxopyranosyloxy)-8-methylcoumarin were thus obtained as a colorless foamy material.

The starting material may be obtained as follows: 18 g. of phenoxy acetic acid were dissolved in 400 ml. of abs. dioxane. To the solution obtained, there were added 28.8 ml. of tri-n-butylamine and 12.3 ml. of ethyl chloroformate (94%). After 10 min., 22.7 g. of 3-amino-4,7-dihydroxy-8-methylcoumarin were added thereto and allowed to stand overnight. The crystalline substance that had then precipitated was filtered off, washed with few dioxane and ether, and dried. There were obtained 13.8 g. of 3-(phenoxy - acetamido)-4,7-dihydroxy - 8 - methyl-coumarin of M.P. 261–262°.

17 g. of the substance thus obtained were dissolved in 1250 ml. of abs, acetone at reflux temperature. The solution was filtered and 132 ml. of a 0.6 molar solution of phenyl diazomethane in petroleum ether was added thereto. Porous clay was given to the solution obtained, initiating thus a vigorous reaction. The reaction mixture was allowed to stand at room temperature overnight, crystallisation occurring thereby. After filtration, the solution was slightly concentrated in vacuo, the precipitate obtained sucked off and washed with acetone and ether. For further purification, the substance obtained was recrystallised from 2500 ml. of nitromethane. 8 g. of 3-(phenoxyacetamido) - 4 - benzyloxy - 7 - hydroxy - 8-methylcoumarin were thus obtained.

Example 15

1.5 g. of 3-[2,2 - dimethyl - chromane-carboxyamido-(6)] - 4 - benzyloxy - 7 - hydroxy - 8 - methylcoumarin were dissolved in 30 ml. of abs. quinoline, and to the solution obtained there were added 3.5 g. of calcium sulfate and 1 g. of silver oxide. After thorough mixing, 1 g. of 5,5-dimethyl-4-O - methyl-2,3-cyclocarbonato-L-lyxopyranosyl chloride was added thereto. After about 6 hours, the reaction mixture was diluted with methylene chloride, freed of silver oxide/silver chloride/calcium sulfate by suction, washed with 3 N sulfuric acid and water, dried and concentrated. 3.22 g. of a residue soluble in benzene were thus obtained. For further purification, this residue was chromatographed on 35 g. of silica gel. Elution with benzene/ether (5%) gave 700 mg. of 3-[2,2 - dimethyl - chromane - carboxamido-(6)]-4-benzyl-oxy - 7 - α - (5,5-dimethyl-4-0-methyl-2,3-cyclocarbonato-L-lyxopyranosyloxy)-8-methylcoumarin.

The compound thus obtained was dissolved in 200 ml. of ethyl acetate and debenzylated by hydrogenation in the presence of 200 mg. of palladium carbon catalyst. Filtering off the catalyst and concentrating the filtrate in vacuo gave 200 mg. of 3-[2,2 - dimethyl - chromane-carboxamido - (6)]-4-hydroxy - 7 - α - (5,5-dimethyl-4-O-methyl-2,3 - cyclocarbonato - L - lyxopyranosyloxy - 8-methylcoumarin, which crystallised from methanol. After recrystallisation from methanol, this substance melted at 164–165°; [α]$_D$=—55° (c.=1 in methylene chloride).

130 mg. of the above first obtained crystallisation product were treated with 25 ml. of liquid ammonia, whereby an immediate clear solution occurred. The ammonia was then evaporated at room temperature and the last traces of ammonia removed by dissolving twice the residue in 20 ml. of abs. methanol and concentrating in vacuo. Thus there were obtained 125 mg. of 3-[2,2-dimethyl - chromane - carboxamido - (6)] - 4 - hydroxy-7-α-(5,5 - dimethyl - 4-O-methyl-3-O-carbamyl-L-lyxopyranosyloxy) - 8 - methylcoumarin as yellowish foamy material.

The starting material may be obtained as follows: 4 g. of 3-amino-4,7-dihydroxy-8-methylcoumarin were dissolved in 30 ml. of abs, pyridine. Then, a solution prepared in the cold with 9 g. of 2,2-dimethyl-chromane-6-carboxylic acid chloride and 30 ml. of abs. pyridine was added, while cooling, to the coumarin/pyridine solution. The mixture was allowed to stand for 24 hours at room temperature whereupon 3 N sulfuric acid was added, with efficient cooling, until slight acid reaction. The precipitated material was sucked off, washed with water and recrystallised from isopropanol. Thus 3.9 g. of 3-[2,2 - dimethyl - chromane - carboxamido - (6)]-4-hydroxy - 7 - [2,2 - dimethyl - chromanoyl - (6)] - 8-methylcoumarin of M.P. 209–210° were obtained.

3.9 g. of the compound thus obtained were dissolved in 70 ml. of abs. dioxane. Then, at room temperature, a solution of 1.6 g. of phenyl-diazomethane in low-boiling petroleum ether were added thereto. After 48 hours' standing, the reaction mixture is concentrated in vacuo and the residue taken up in ethyl acetate. Scratching started a slow crystallisation. The crystallisation product was sucked off and washed with ethyl acetate and ether. M.P. 238–240°; yield: 3.1 g.

3 g. of the compound thus obtained were dissolved in 100 ml. of dimethyl formamide. To this solution there was added an aqueous solution of 3 g. of potassium hydroxide in a few amount of water. The mixture was then stirred for 12 hours at room temperature, then acidified with 3 N sulfuric acid and the precipitated product sucked off. After recrystallisation from ethanol, there were obtained 1.7 g. of crystalline 3 - [2,2-dimethyl-chromane-carboxamido - (6)] - 4 - benzyloxy-7-hydroxy-8-methyl-coumarin of M.P. 227–228°.

Example 16

3.3 g. of 3-nitro-4-benzyloxy-7-hydroxy-8-methyl-coumarin were dissolved at room temperature in 100 ml. of abs. quinoline. To the clear solution there were given 4.3 g. of freshly precipitated silver oxide (dried over phosphorus pentoxide) and 5 g. of freshly calcined calcium sulfate (anhydrous). To this heterogeneous suspension, there was added dropwise a solution of 3 g. of 5,5-dimethyl-4-O-methyl-2,3-cyclocarbonato-L-lyxopyranosyl chloride and 25 ml. of quinoline. The heterogeneous mixture was stirred for 5 hours, whereupon the precipitated silver salts and unreacted starting material were filtered off over "Celite." The filtrate was then diluted with ethyl acetate and the quinoline eliminated by shaking with 3 N sulfuric acid. The ethyl acetate solution obtained was then washed with water until neutral, dried over sodium sulfate and freed of the solvent in vacuo. The residual 4 g. of a dark brown oil were chromatographed for further purification. Said residue was adsorbed on 120 g. of silica gel in benzene/ethyl acetate (1%) and eluted. The eluate with benzene/ethyl acetate (20%) and (50%) contained the desired 3 - nitro - 4 - benzyloxy - 7 - α - (5,5 - dimethyl - 4-O - methyl - 2,3 - cyclocarbonato - L - lyxopyranosyloxy)-8-methylcoumarin, which was used direct for the next reaction step.

1.2 g. of the compound obtained above were hydrogenated in 50 ml. of ethyl acetate in the presence of 500 mg. of 5% palladium carbon catalyst. Once the uptake of hydrogen had subsided, the catalyst was filtered off and the solvent evaporated off in vacuo. The red-brown crystalline residue, 3 - amino - 4 - hydroxy - 7 - α - (5,5 - dimethyl - 4 - O - methyl - 2,3 - cyclocarbonato - L - lyxopyranosyloxy)-8-methylcoumarin, was identical with the product obtained in Example 2.

2.7 g. of this compound were dissolved in 20 ml. of anhydrous pyridine. To this solution there was added a solution of 3-allyl-4-acetoxy-benzoyl chloride and 20 ml. of anhydrous pyridine, while cooling. The reaction mixture was allowed to stand for 24 hours at room temperature, then diluted with ethyl acetate and washed sucessively with 3 N sulfuric acid, 1 N sodium bicarbonate and water until neutral. After drying over sodium sulfate, there were obtained 5.54 g. of a yellow foamy substance. For further purification, the compound was chromatographed over 55 g. of silica gel in benzene. Elution with benzene/ether (5%), (10%) and (20%) yielded 2.2 g. of 3 - (4 - acetoxy - 3 - allyl - benzamido) - 4 - hydroxy-7 - α - (5,5 - dimethyl - 4 - O - methyl - 2,3 - cyclocarbonato-L-lyxopyranosyloxy-8-methyl coumarin. [α]$_D$= —40.5° (c.=1 in chloroform).

400 mg. of the aforementioned compound were easily dissolved in 10 ml. of liquid ammonia. After the solution was complete, the ammonia was evaporated at room temperature and the last traces thereof removed by evaporating twice with 20 ml. of anhydrous methanol. Yield: 380 mg. of 3 - (4 - hydroxy - 3 - allyl - benzamido) - 4 - hydroxy - 7 - α - (5,5 - dimethyl - 4 - O - methyl - 3 - O-carbamyl-L-lyxopyranosyloxy)-8-methylcoumarin as a colorless foamy material.

We claim:
1. A compound selected from the group consisting of the formula

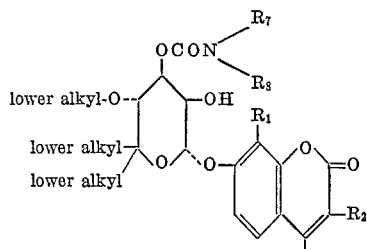

and compounds of the formula

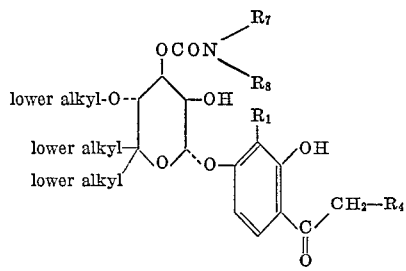

wherein $R_1$ is selected from the group consisting of hydrogen and halogen; $R_2$ is selected from the group consisting of hydrogen, nitro, nitroso, phenylazo, amino, benzyloxycarbonylamino, dibenzylamino, trifluoroacetamino and acylamino; $R_5$ is benzyl, except, when $R_2$ is selected from the group consisting of hydrogen and acylamino, $R_5$ is selected from the group consisting of benzyl and hydrogen, and, when $R_2$ is selected from the group consisting of phenylazo and amino, $R_5$ is hydrogen; $R_4$ is selected from the group consisting of hydrogen, nitro, nitroso, amino, benzyloxycarbonylamino, dibenzylamino, trifluoroacetamino and acylamino; and $R_7$ and $R_8$ are selected from the group consisting of hydrogen and lower alkyl.

2. A compound selected from the group consisting of compounds of the formulas of claim 1, wherein $R_1$ is lower alkyl; $R_2$ is selected from the group consisting of hydrogen, nitro, nitroso, phenylazo, amino, benzyloxycarbonylamino, dibenzylamino and trifluoroacetamino; $R_5$ is benzyl, except, when $R_2$ is selected from the group consisting of phenylazo and amino, $R_5$ is hydrogen; $R_4$ is selected from the group consisting of hydrogen, nitro, nitroso and amino; and $R_7$ and $R_8$ are selected from the group consisting of hydrogen and lower alkyl.

3. A compound selected from the group consisting of compounds of the formulas of claim 1, wherein $R_1$ is lower alkyl; $R_2$ and $R_4$ are 4-$R_6$-benzoylamino; $R_3$ is benzyl; $R_6$ is selected from the group consisting of hydroxy, lower alkanoyloxy and lower alkoxy; and $R_7$ and $R_8$ are selected from the group consisting of hydrogen and lower alkyl.

4. A compound selected from the group consisting of compounds of the formula of claim 1, wherein $R_1$ is selected from the group consisting of hydrogen, halogen and lower alkyl; $R_2$ and $R_4$ are amino; $R_3$ is hydrogen; and $R_7$ and $R_8$ are selected from the group consisting of hydrogen and lower alkyl.

5. A compound selected from the group consisting of compounds of the formula

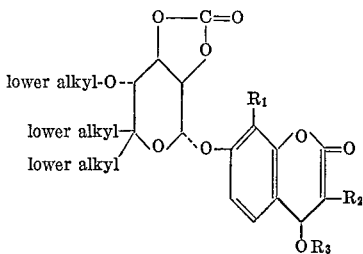

and compounds of the formula

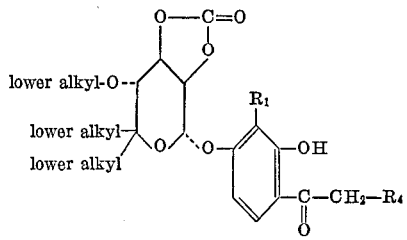

wherein $R_1$ is selected from the group consisting of hydrogen, halogen, and lower alkyl; $R_2$ is selected from the group consisting of hydrogen, nitro, nitroso, phenylazo, amino, benzyloxycarbonylamino, dibenzylamino, trifluoroacetamino and acylamino; $R_3$ is benzyl except when $R_2$ is acylamino, $R_3$ is selected from the group consisting of hydrogen and benzyl, and when $R_2$ is selected from the group consisting of phenylazo and amino, $R_3$ is hydrogen; and $R_4$ is selected from the group consisting of hydrogen, nitro, nitroso, amino, benzyloxycarbonylamino, dibenzylamino, trifluoroacetamino and acylamino.

6. A compound as in claim 5, which is 3-(4-hydroxy-3-lower alkenyl - benzoylamino) - 4 - hydroxy - 7 - α - (5,5-di-lower alkyl-4-O-lower alkyl-2,3-cyclocarbonato-L-lyxopyranosyloxy)-8-lower alkylcoumarin.

7. A compound as in claim 5, which is 3-(4-hydroxy-3-lower alkyl - benzoylamino) - 4 - hydroxy - 7 - α - (5,5-di - lower alkyl - 4 - O - lower alkyl - 2,3 - cyclocarbonato-L-lyxopyranosyloxy)-8-lower alkylcoumarin.

8. A compound as in claim 5, which is α-amino-2-hydroxy-3-lower alkyl-4-α-(5,5-di-lower alkyl-4-O-lower alkyl - 2,3 - cyclocarbonato - L - lyxopyranosyloxy) - acetophenone.

9. A compound as in claim 5, which is 3-amino-4-hydroxy - 7 - α - (5,5 - di - lower alkyl - 4 - O - lower alkyl-2,3 - cyclocarbonato - L - lyxopyranosyloxy) - 8 - lower alkylcoumarin.

References Cited
UNITED STATES PATENTS
2,481,417  9/1949  Hales _____ 260—210
2,616,889  11/1952  Velluz et al. _____ 260—210
2,966,509  12/1960  Stammer _____ 260—210

LEWIS GOTTS, *Primary Examiner.*

JOHNNIE R. BROWN, *Assistant Examiner.*

U.S. Cl. X.R.

260—141, 144, 151, 152, 343.2, 562, 570.5, 592